Oct. 25, 1938.   M. L. ECKMAN   2,134,110

FLUID CONDUIT

Filed Feb. 23, 1937

INVENTOR.
MERIL L. ECKMAN
BY
Bates, Goldrick & Teare
ATTORNEYS.

Patented Oct. 25, 1938

2,134,110

UNITED STATES PATENT OFFICE 2,134,110

FLUID CONDUIT

Meril L. Eckman, Cleveland, Ohio, assignor to American Coach and Body Company, Cleveland, Ohio, a corporation of Ohio Application February 23, 1937, Serial No. 126,996

4 Claims. (Cl. 219—4)

This invention relates to an improved conduit and method of making the same. More particularly this invention relates to an improved conduit for facilitating the circulation of a cooling medium in an electric welding tool or the like, and the method of making such conduits. These, therefore, are the general objects of the present invention.

Electric welding tools and mechanism generally comprise ferrous castings in the form of frames which support the welding electrodes. The electrodes used are generally hollow and are in communication with cored passageways in the castings. One of these passageways admits cooling fluid to the electrode, while the other permits the fluid to leave the tool. The walls of these passageways are subjected to corrosion which tends to obstruct the circulation of the cooling fluid, sometimes entirely stopping such circulation. Likewise, minute flaws, crevices and pin holes, which at first are too minute to be observed or even to permit the seepage of the cooling medium therethrough, sometimes open or become enlarged from the strains set up in the metal structure as a result of constant heating and cooling of the tool.

It is a more specific object of the present invention to provide a conduit which may be readily inserted in suitable preformed passageways in the frame of a welding tool apparatus, and which will overcome the disadvantages of the passageway above set out. In this connection my invention embodies a conduit which may be economically manufactured.

Another object of the present invention is to provide a tubular conduit having two independent passageways therethrough, and to provide a simple and economical method of manufacturing such a conduit.

Other objects of the present invention will become more apparent from the following description, reference being had to the accompanying drawing in which I illustrate a preferred form of my invention.

Figure 1:
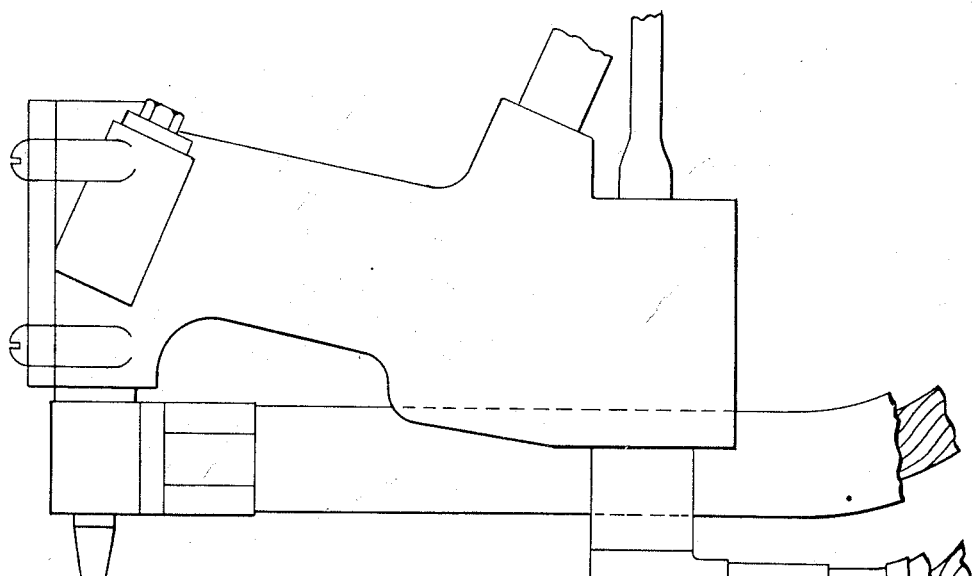
Figure 2:
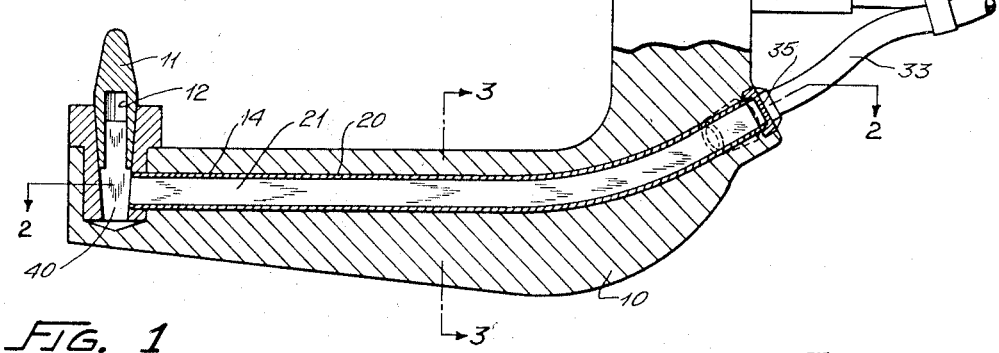
Figures 3, 4:
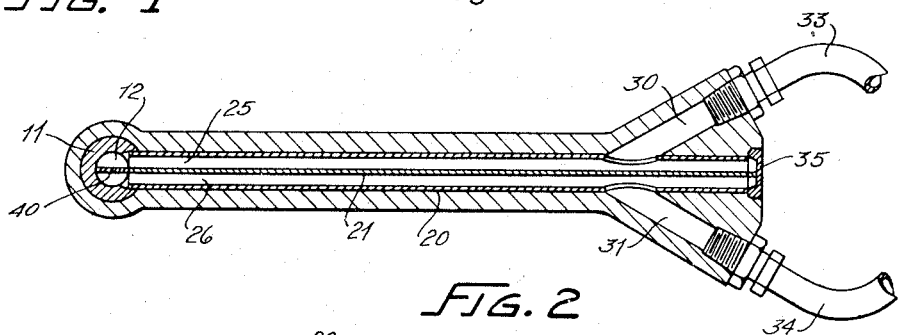

In the drawing, Fig. 1 is a side elevation partially in section of a welding tool, illustrating my improved conduit in use therewith, portions of the tool and conduit having been broken away to more clearly illustrate the construction thereof; Fig. 2 is a sectional detail, taken along the offset line 2—2 of Fig. 1; Fig. 3 is a transverse section, as indicated by the line 3—3 on Fig. 1; Fig. 4 is a view of my improved conduit, partially broken away, to more clearly illustrate the internal construction thereof.

Referring now to the drawing, I have illustrated in Fig. 1 my improved conduit in connection with an electric welding tool. The tool illustrated comprises a frame 10, carrying an electrode 11. The electrode is hollow and the opening 12 therein is in communication with a passageway 14 formed in the frame. In the construction illustrated, but one passageway 14 is provided, but by the use of my improved conduit or liner this passageway serves both to conduct the cooling fluid to the electrode in one stream and to conduct such cooling fluid from the electrode in a second stream.

My improved conduit or liner comprises a comparatively thin-walled metallic tube 20, preferably made of copper, brass or other non-corrosive material. Extending longitudinally through the tube is a partition or wall 21, comprising an elongated metallic strip. This strip may likewise be formed of a non-ferrous material to eliminate corrosion. In manufacturing the assembly, one end of the elongated strip is inserted in one end of the tube and the strip is slid lengthwise therethrough. The strip 21 is of such heighth as to frictionally engage opposite regions of the tube and fit snugly therein. This partition or strip 21 divides the tube into two longitudinally extending passageways. The diameter of the tube is such that the assembled tube may be readily slid into the passageway into the tool and yet when in position will frictionally engage the walls of the passageway, fitting snugly therein to thereby permit the cooling of the frame itself when the fluid passes through the conduit. In the preferred form the tube and the partition are assembled in straight form and are subsequently bent as a unit to any desired curvature.

The two passageways 25 and 26 are continued to a point adjacent the tip of the electrode 11 by a tongue-like partition 40 which is inserted in the opening 12 in the electrode in alignment with the tube partition 21, thus forming a continuation of such partition.

Many times it is advisable to provide the frame members with a passageway which departs from a straight line, as indicated in Fig. 1. This is sometimes done to attain the greatest possible structural advantages in the casting, or to bring the outlet of the passageway to a region of the frame least effected by the heat of the electrode. To permit the use of my improved conduit in such instances, I prefer to make both the tube 20 of a bendable material and the partition of a material which will permit it to be bent in the plane of the partition as indicated in the drawing. I find that a comparatively soft brass or copper provides such a material. However soft steel or iron may be used when extreme bending of the conduit is not required. When the passageway 14 is formed, as shown in Fig. 1, my improved conduit which is preferably made in a straight length, bends to conform with the curvature of the passageways as it is inserted therein.

After the conduit has been positioned in the passageway in the tool, the frame may be drilled to provide two passageways 30 and 31 which intersect respective passageways of my improved conduit, permitting supply conduits 33 and 34 to be connected therewith, as shown in Fig. 2. The outer end of the passageway 14 may then be sealed with a suitable plug 35, which also serves to close the end of the conduit 20.

From the foregoing description it will be seen that I have provided an improved conduit having two longitudinal passageways therein, which conduit is especially adapted for use in welding mechanisms and which requires but one opening in the casting. Further my improved conduit insures unobstructed passage of the cooling fluid which otherwise might be caused by corrosion or other similar action, and at the same time provides a maximum cooling of the casting through which the conduit passes.

While I have described my improved conduit in connection with a welding mechanism, it is obvious that the conduit may be put to many other uses in which a single tube is desired for providing two longitudinally extending passageways.

I claim:—

1. In a welding mechanism, the combination of a frame, a welding electrode carried thereby, said frame having a single curved passageway extending therethrough and in communication with said electrode, a tube within said frame and frictionally engaging the walls of said passageway throughout its length, a relatively thin strip of material within the tube, the width of said strip being substantially equal to the internal diameter of the tube and the strip being bent in its own plane to form a plurality of substantially longitudinally extending unobstructed passageways each of which passageways are in communication with said electrode.

2. In a welding mechanism having a frame supporting a hollow welding electrode, the frame having a single passageway extending therethrough and in communication with said hollow electrode, in combination with a tube received by said single passageway and frictionally engaging the walls thereof, a partition within said tube, the width of which is substantially equal to the internal diameter of the tube, whereby the partition remains in self-supporting position within the tube solely by frictional engagement between the longitudinal edges thereof and the wall of the tube, and a tongue-like partition carried by the hollow electrode and arranged in coplanar relationship to the first-named partition to form a continuous passageway which leads from the exterior of the frame to the hollow electrode and thence outwardly therefrom to the exterior of said frame.

3. In a welding mechanism having a frame supporting a hollow welding electrode, the frame having a passageway extending therethrough and in communication with said hollow electrode, in combination with a tube received by said passageway and frictionally engaging the wall thereof, a partition within said tube supported solely by frictional engagement, and a tongue-like portion carried by the hollow electrode in alignment with the first-named partition and having its inserted end spaced apart from the opening in said electrode to form a continuous passageway leading from the exterior of the frame to the hollow electrode and thence outwardly therefrom to the exterior of said frame.

4. A welding mechanism of the type described, wherein a frame supports a hollow electrode, in combination with a tube frictionally received by a single passageway in said frame, a partition in said tube to divide the latter into a plurality of fluid passageways, and a second partition in the hollow electrode, said last-mentioned partition being in alignment with the first-mentioned partition, thus forming a continuation of such partition and a continuous fluid passageway through the frame and to and from said electrode.

MERIL L. ECKMAN.